United States Patent Office 3,359,193
Patented Dec. 19, 1967

3,359,193
HEAT RECOVERABLE CROSS-LINKED POLYMERS OF VINYL CHLORIDE AND A POLYUNSATURATED MONOMER
Solomon Harris Pinner, Hinxton Hall, Essex, England, assignor to Raychem Corporation, Redwood City, Calif., a corporation of California
No Drawing. Continuation of application Ser. No. 680,918, Aug. 29, 1957. This application Aug. 14, 1962, Ser. No. 216,746
Claims priority, application Great Britain, Aug. 30, 1956, 26,489/56
15 Claims. (Cl. 204—159.17)

This application is a continuation of my copending application Ser. No. 680,918, filed Aug. 29, 1957, now abandoned.

This invention relates to improvements in the manufacture of compositions based on chlorinated polymers in general and on polyvinyl chloride in particular. Polyvinyl chloride compositions are widely used both in the manufacture of coatings and flexible films and also in the production of rigid sheet. During all processes of manufacture, the sensitivity to heat of these polymers requires special precautions to be taken. Normally, this fault is dealt with by compounding and milling the composition at the requisite temperature as expeditiously as possible and by blending in a suitable stabilizing agent. It is known that the processing temperature can be reduced by increasing the plasticiser content of the composition, but this normally produces a material which may be softer and more flexible than that which is required.

Processing requirements are particularly stringent during the manufacture of rigid P.V.C., this is, completely unplasticised P.V.C. Processing has been facilitated by the employment of special low molecular weight grades of P.V.C. This is only a compromise since the product has reduced toughness compared to P.V.C. of high molecular weight. Moreover, the product still tends to discolour and commercial grades of unplasticised P.V.C., as exemplified by Darvic (registered trademark), are usually light yellow in colour and somewhat opaque.

Other forms of rigid material have been made by copolymerising vinyl chloride with small proportions of other vinyl monomers such as vinyl acetate or vinylidene chloride. Such copolymers are known as Vybak (registered trademark) or Cobex (registered trademark). These copolymers are more transparent and readily calenderable but have reduced softening temperatures and solvent resistance compared with vinyl chloride homopolymers.

Furthermore, unplasticised P.V.C. is normally processed mainly by the calendering technique. Because the flow temperature is so close to the decomposition temperature, such techniques as extrusion and injection moulding are applicable to unplasticised P.V.C. only if the extrusion or injection machines are very carefully designed and operated and means exist for very accurate temperature control.

It is obviously desirable to have some means of increasing the mobility of P.V.C. compositions at the moulding temperature without at the same time increasing softness at normal use temperature. This objective can only be achieved if the agent causing high temperature mobility can be subsequently removed. It has been proposed, for example, to increase the stiffness of P.V.C. coatings by leaching out the plasticiser with a solvent but this is a tedious and wasteful process.

It has now been found that by the use of selected liquid monomeric substances, which can be polymerised within the composition by exposure to high energy radiation, it is possible to prepare essentially rigid polyvinyl chloride formulations while using the same blending and milling conditions as for soft and flexible grades. The monomeric substances should have a solvating or plasticising action on the polyvinyl chloride and should have low volatility. After converting the composition into its final form, whether sheet, tube, film, etc., this is now exposed to high energy radiation such as X-rays, gamma rays, high energy electrons and the like, which have the effect of converting the liquid material to a polymeric solid, which has only a slightly plasticising action and which may be chemically linked to the polyvinyl chloride. The compositions may include the normal ingredients, such as fillers, stabilizers, pigments etc.

It is also possible by selection of the appropriate monomer to produce a material, which, after irradiation, is insoluble and infusible. For this purpose, it is desirable to use a tetrafunctional monomer which may be regarded as a cross-linking agent. The cross-linking agent may be added along with the solvating monomer prior to compounding and calendering, but alternatively may be imbibed by the already calendered sheet prior to irradiation, when it will be homogeneously converted along with any polymerisable ingredients. Only a relatively small proportion of the added monomers need be of the cross-linking variety.

It has been further observed that certain monomeric substances have the power to arrest the normal discolouration which ensues when polyvinyl chloride is exposed to high energy radiation. Not only is the radiation induced discolouration inhibited but the material may also be less sensitive to subsequent heat discolouration. Other things being equal, it is preferable to select these monomers with protective action as the ingredients of the polyvinyl chloride compositions. These monomers appear only to protect against radiation-discolouration, while they remain incompletely polymerised. However, this protective quality is not confined to monomers but is exhibited also by certain normal plasticisers for polyvinyl chloride, such as dioctyl phthalate. In consequence, it is sometimes desirable to include a non-convertible plasticiser along with the convertible plasticiser. This enables all the convertible plasticisers to be polymerised by the radiation without developing a dark colour at the same instant. In certain cases, of course, the discolouration is advantageous, e.g. for decorative purposes. The sharp change in the resistance to discolouration as all the convertible plasticiser is used up may accordingly be exploited to produce sharp colour boundaries.

In general, compounds characterized by the structure

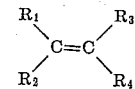

in which two or three of the attached groups are hydrogen atoms, are suitable ingredients of polyvinyl chloride mixtures to be converted by irradiation. Those radicals which are not hydrogen may be variable within wide limits and include alkyl, aryl, alkenyl, alkinyl, alkoxy and acyl radicals and groups consisting of or containing keto, hydroxy, carboxy, carbalkoxy, amido, amino, halogen, sulphonyl, nitrile groups and/or homocyclic and heterocyclic rings. When one or more of the substituents contain olefinic double bonds of the same type as that described above, then the compound behaves as a tetrafunctional or hexafunctional monomer and in the course of polymerising in situ yields a cross-linked infusible and insoluble composition.

Of the many possible olefinic compounds that can be used, it is usually advantageous to employ substantially non-volatile monomers at least one of which contains ester groups, amide groups, epoxy groups or other groups known to have a solvating and plasticising action on the polyvinyl chloride. The following monomers exemplify the classes of monomers most suitable either alone or in admixture for the performance of this invention; alkyl acrylates and methacrylates, such as lauryl methacrylate, nonyl methacrylate, B-ethoxy ethyl methacrylate, B-allyl-oxyethyl acrylate and lauryl acrylate; alkyl maleates and fumarates such as octyl maleate, octyl fumarate, nonyl maleate and nonyl fumarate; polyallyl esters such as diallyl phthalate, diallyl adipate, diallyl sebacate, triallyl cyanurate, diallyl terephthalate, diallyl isophthalate, diallyl maleate, triallyl trimellitate and tetra-allyl pyromellitate; diallyl and triallyl phenols and their esters, phosphates, epoxides and ethers such as orthoallyl phenyl allyl ether; allyl carbonates such as bisallyl diethyleneglycol carbonate; methylallyl and crotonyl esters and ethers; dimethacrylates and diacrylates such as ethylene dimethacrylate, glyceryl triacrylate, diethylene glycol dimethacrylate and polyethylene oxide dimethacrylate; divinyl and trivinyl hydrocarbons such as divinyl benzene, trivinyl benzene, divinyl naphthalene; amides such as methylene-bis-methacrylamide.

The type of high energy radiation suitable for the performance of this invention is not critical and may be adapted to the purpose and application in hand. To some extent, the selection might be made on the basis of the dose and penetration required. The dose required varies widely depending on the type and amount of convertible plasticiser and other ingredients present, but normally falls in the range of 0.1 to 100 megarads. Where very sensitive monomers are present, such as diacrylates, the dose for complete conversion is very low, often not exceeding 0.5 megarad. In this case, it may be preferred to use fission products or radioactive isotopes such as $Co^{60}$ to generate the required radiation. With monomers such as alkyl maleates, relatively high radiation doses are required, such as 50 mrad., whereupon it is more convenient to use as the high energy radiation, accelerated electrons of 1–5 mev., such as those generated by a Van de Graaff accelerator.

Within the scope of this invention, there are numerous embodiments capable of exploitation for the production of new and useful articles of commerce. This arises largely because of the versatility of polyvinyl chloride and the extensive art related thereto. The employment of this invention may be beneficial in any application for which plasticised polyvinyl chloride or its copolymers are currently used by way of increasing its rigidity, reducing its solubility or otherwise improving its performance or processing characteristics.

This invention is beneficial also in applications involving unplasticised polyvinyl chloride, inasmuch as it may provie higher strength and higher softening temperatures. It may be beneficial also to the application of vacuum moulded articles, to foamed articles, to sandwich structures, in the bonding of dissimilar materials, to reinforced structures and to coatings. Above all, the use of this invention may still further widen the scope for polyvinyl chloride and its copolymers in rendering possible new applications for which it has hitherto been unsuited.

The two major drawbacks restraining the wider utilization of vinyl chloride polymers are the low softening point of the rigid grades and the lack of permanence of the plasticised grades. This invention provides the means of overcoming both limitations.

In one embodiment of this invention, powdered high molecular weight polyvinyl chloride is milled with diallyl phthalate, then pressed or calendered into sheet or extruded into tubing. The moulded products is then exposed to high energy electrons until the deposited dose is sufficient to convert all the diallyl phthalate into polymeric material. The product is cross-linked and rigid with a softening point considerably higher than normal unplasticised polyvinyl chloride.

In another embodiment of this invention, powdered high molecular weight polyvinyl chloride is milled with diallyl sebacate and with a non-migratory plasticiser such as a low molecular weight butadiene-acrylonitrile copolymer (e.g. products registered under the trademark "Hycar"). The compound is then converted to sheet or tubes in the normal manner and is then exposed to a sufficient dose of high energy electrons to convert all the diallyl sebacate. The resultant product is still plasticised but is cross-linked, i.e. it will swell but not dissolve in a suitable solvent such as tetrahydrafuran. However, the plasticiser is non-migratory.

If non-migratory properties are not essential, the Hycar could be replaced by a conventional ester plasticiser such as dioctyl phthalate. The resultant product resembles normal plasticised P.V.C. but is nevertheless cross-linked, i.e. incompletely soluble.

If still greater permanence is desired than can be obtained with Hycar, a further embodiment of this invention is available, whereby vinyl chloride is copolymerised with at least an equal weight of a long chain vinyl ester such as vinyl caprate or vinyl laurate. The resultant copolymer has a very low softening point, but if milled with a low proportion of diallyl adipate or similar monomer and then irradiated, it becomes cross-linked and exhibits most of the properties of normal plasticised polyvinyl chloride, but, of course, the plasticisation is completely permanent.

Various industrial processes and applications are suggested by this invention. One such process might be called "radiation moulding." This allows the production of shaped articles which do not deform spontaneously if heated to their softening point, in the same way as vacuum moulded or injection moulded articles. The composition of P.V.C. containing a convertible plasticiser of the type described herein is first extruded or moulded into sheet form. By means of jigs or clamps, it is constrained to a desired shape or contour and irradiated under this constraint, as a result of which it becomes rigid. This shape is now permanent and no spontaneous deformation or recovery occurs if the article is heated above the softening point of the new composition. Even if during subsequent heating, the shape is forcibly flattened or otherwise deformed and held in this condition till cool, then recovery to the moulded shape will occur at any future time if the article is merely reheated. Such a process, which only works provided the proportion of convertible plasticiser exceeds certain limits, clearly has many possible applications.

This invention has application in the formation of foamed sandwich structures. One commences with "plaste-grade" P.V.C. which is compounded with diallyl sebacate and a suitable blowing agent such as Genitron OB (registered trademark) to form a paste-like suspension of P.V.C. The paste is cast, trowelled or lightly gelled into sheet form, then irradiated on one or both surfaces with radiations of limited penetration such as 1 mev. electrons. This hardens the surfaces. The assembly is now heated to liberate gas from the blowing agent, and foam the structure when a flexible foam sandwiched between rigid sheets results.

Similar sandwich structures can be made without the presence of blowing agent. The P.V.C. composition containing a convertible plasticiser is moulded or extruded into film, flat sheets, tubes or cable covering and is then exposed to a weak beta-ray emitter or other radiations of low penetration. This will convert only the exposed outermost layers into rigid material giving a product with a hard skin chemically bonded to a rubber-like interior.

These processes may be combined with reinforcing agents such as glass fibre mat by taking advantage of the fact that the plasticised P.V.C. containing convertible plasticiser may be made fluid enough to interpenetrate the reinforcement thoroughly. Subsequently, the assembly is irradiated to render the structure rigid and infusible and to constitute a reinforced article which could not have been made directly from unplasticised P.V.C. due to the limited mobility of this material.

Non-fibrous reinforcement such as carbon black at high loadings could be employed with similar advantages. Such composition of P.V.C. containing convertible plasticisers and fillers could be constituted as moulding powders with good flow characteristics, which after injection mouldings, need merely be exposed to high energy radiation to convert into rigid material. Thus, this invention permits rigid P.V.C. mouldings to be designed for applications closed hitherto to this material because of the moulding difficulties associated with unplasticised P.V.C.

The nature of the change wrought by exposure to high energy radiation of the compositions of this invention is illustrated by the following examples. The amount of radiation necessary to produce the desired change is a function of the type and concentration of the convertible plasticiser, but depends also on the other ingredients present. The following tables indicate the physical properties of selected compositions after having received the indicated doses.

Example 1

Polyvinyl chloride powder was premixed for 30 minutes with 0.5 phr. dibutyl tin-dilaurate (DBTL) and varying proportions of diallyl phthalate. The mixture was then fluxed on hot twin roll mills for 5 minutes and the milled stock was pressed into one thirty second inch thick sheet in a hydraulic press. Portions of the sheet were exposed to electrons generated by a 2 mev. Van de Graaff accelerator till they acquired the indicated dose. Various physical and mechanical tests were then carried out. Table 1 shows the tensile strength at 150° C. of the various irradiated compositions, whence it is seen that great increases of strength occur as a result of irradiation but that the dose to bring this about increases as the amount of diallyl phthalate in the composition increases.

TABLE 1.—TENSILE STRENGTH P.S.I. AT 150° C. OF COMPOSITIONS OF EXAMPLE 1

| Parts diallyl phthalate per 100 parts P.V.C. | Dose in Megarads | | | | |
|---|---|---|---|---|---|
| | 0 | 8 | 15 | 25 | 50 |
| 25 | | 214 | 236 | 228 | |
| 40 | 0 | 64 | 219 | 216 | |
| 60 | 0 | 16 | 47 | 278 | |
| 80 | 0 | 0 | 0 | 107 | 230 |
| 100 | 0 | 0 | 0 | 0 | 240 |

Example 2

The same series of mixes were made, pressed and tested as described in Example 1 except that diallyl sebacate was used in place of diallyl phthalate. Tensile strength results are given in Table 2, which shows that higher strengths appear to be obtainable with this plasticiser, but there is the same dependence of threshold dose for developing strength on the amount of plasticiser.

TABLE II.—TENSILE STRENGTH P.S.I. AT 150° C. OF COMPOSITION OF EXAMPLE 2

| Parts diallyl sebacate per 100 parts P.V.C. | Dose in Megarads | | | |
|---|---|---|---|---|
| | 0 | 8 | 15 | 25 |
| 20 | 0 | 292 | 427 | 420 |
| 40 | 0 | 58 | 243 | 457 |
| 60 | 0 | 23 | 118 | 213 |
| 80 | 0 | 0 | 36 | 204 |
| 100 | 0 | 0 | 0 | 143 |

Example 3

The same series of mixes were made, pressed and tested as described in Example 1 except that the P.V.C. was compounded with a mixture of nonyl methacrylate and ethylene dimethacrylate in place of the diallyl phthalate. Tensile strength results are given in Table 3, which shows that lower ultimate strengths are attained but that the threshold dose for developing strength while still dependent on the amount of plasticiser, is very much lower. It was also noted that the colour of these samples was superior to those of Examples 1 and 2. This is a consequence of the lower radiation doses necessary to produce crosslinking.

Table III.—Tensile strength p.s.i. at 150° C. of composition of Example 3

| Phr. nonyl methacrylate/phr. ethylenedimethacrylate | Dose in Megarads | | | |
|---|---|---|---|---|
| | 0 | 0.5 | 2 | 8 |
| 15/5 | 0 | 85 | 87 | 129 |
| 30/10 | 0 | 89 | 98 | 176 |
| 45/15 | 0 | 42 | 113 | 161 |
| 75/25 | 0 | 0 | 80 | 119 |

Example 4

A three inch long specimen of the composition P.V.C. 100 parts; diallyl phthalate 60 parts; DBTL 0.5 part was bent double till the ends touched, then irradiated while taped in this form to a dose of 20 megarads. The tape was removed and the specimen placed in an oven for 30 minutes at 100° C. Although this temperature was sufficient to make the specimen soft and flexible, the separation of the ends was only 0.25 inch. While soft and flexible, the specimen was forcibly flattened and held flat till cool and then returned to the oven. On removal, it had returned to its bent form with an end separation of 0.5 inch. Other compositions containing 40 phr. and 80 phr. diallyl phthalate and irradiated to 20 megarad in a bent form flattened completely when heated to 100° C., showing that the inter-relationship between convertible plasticiser compositions and dose was quite critical.

Example 5

A sheet of thickness one quarter inch of the same composition as that of Example 4 was exposed to an electron beam of penetration one sixteenth inch till the energy deposited was 15 megarad. There resulted a sheet with one rigid surface and one flexible rubber-like surface.

Example 6

A sheet of the composition P.V.C. 100 parts; triallyl cyanurate 40 parts; DBTL 0.5 part was electron irradiated till the energy deposited was 10 megarad. The product was 8.0% soluble in boiling ethanol and 2% soluble in boiling tetrahydrofuran. It had a room temperature tensile strength of 9,500 p.s.i. and an elongation of 30%. Prior to irradiation, it was 100% soluble in boiling tetrahydrofuran and it had a tensile strength of 2,900 p.s.i. and an elongation of 200%. At 100° C. the tensile strength was 3,000 p.s.i. and the elongation 10%. At 150° C. the tensile strength was in excess of 1,500 p.s.i.

Example 7

A sheet of composition P.V.C. 100 parts; nonyl methacrylate 40 parts; divinyl benzene 10 parts, carbon black 43 parts, dibasic lead carbonate 6 parts, calcium stearate 1 part was electron irradiated until the energy deposited was 1 megarad. The product had a room temperature tensile strength of 7,600, p.s.i. Prior to irradiation, the composition lost 1.2% in weight when stored for 2 hours at 100° C. This indicated that the composition has an adequate storage life.

Example 8

A sheet of composition P.V.C. 100 parts, diallyl phthalate 80 parts and DBTL 0.5 part was electron irradiated until the deposited dose was 40 megarad. A one and a half inch diameter disc was placed in an oven at 90° C. and impressed with a dead load of 1 kilogram bearing on a stud of one eighth inch diameter for 2 hours. After cooling, with the load still applied, there was observed to be a permanent indentation 0.001 inch deep. The same experiment performed with "Cobex" and "Darvic" gave impressions .007 inch and .004 inch respectively.

*Example 9*

A blend of the unplasticised polyvinyl chloride with acrylonitrile copolymers described by the manufacturers (British Geon) as high impact P.V.C. (Grade RA.170) was found to have 100° C., a tensile strength of 500 p.s.i. and an elongation of 210%. A specimen was exposed to an electron beam until the energy deposited was 15 megarads. The tensile strength at 100° C. was now found to be 1,100 p.s.i. with an elongation of 300%. The high impact P.V.C. was mixed with 25 phr. of diallyl phthalate on heated twin roll mills and the milled stock was pressed into a 1/16 inch thick sheet. On exposure to high energy electrons until the energy deposited was 15 megarads, the tensile strength at 100° C. was 1,900 p.s.i. with an elongation of 250%.

*Example 10*

The high impact P.V.C. was blended with 40 parts of triallyl cyanurate on heated twin roll mills and the milled stock was pressed into 1/16 inch thick sheet. Following exposure to high energy electrons until the energy deposited was 15 megarads, the properties at various temperatures were as follows:

|  | Tensile Strength, p.s.i. | Elongation, Percent |
| --- | --- | --- |
| Room Temp | 7,000 | 10 |
| 100° C | 2,600 | 45 |
| 150° C | 920 | 35 |

Another sample of this material was bent double and irradiated in this form in the manner described in Example 4. After 13 minutes at 100° C., the separation of the ends was found to be 0.5 inch. A further sample of this material was impressed with a dead load of 1 kg. in the manner described in Example 8 while held in an oven for 2 hours at 120° C. After cooling with the load still applied, there was observed to be a permanent indentation of less than 0.001 inch.

I claim:

1. A process for making an article capable of recovering an original shape upon the application of heat comprising heating a shaped article comprising a high energy irradiation cross-linked mixture of a vinyl chloride polymer with an essentially nonvolatile polymerizable polyunsaturated monomer to its softening range; deforming said heated article and cooling said deformed article whereby said article is caused to retain its deformed shape until reheated to cause it to recover substantialy its original shape.

2. The process of claim 1 wherein said mixture is irradiated to a dose of between 0.1 and 100 megarads.

3. The process of claim 1 wherein said monomer is present in an amount of from about 10 to about 200 parts per weight and said vinyl chloride polymer is present in about 100 parts by weight.

4. The process of claim 1 wherein said monomer is selected from the group consisting of allyl esters of polycarboxylic acids, polyallyl esters of cyanuric acid, polyvinyl aromatic hydrocarbons, polymethacrylamides, and polyacrylates and polymethacrylates of saturated polyalcohols.

5. The process of claim 1 wherein said monomer is triallyl cyanurate and said polymer is polyvinyl chloride.

6. The process of claim 1 wherein said polymer is polyvinyl chloride.

7. The process of claim 1 wherein said monomer is present in an amount of from about 10 to about 200 parts per weight and said vinyl chloride polymer is present in about 100 parts by weight.

8. The process of claim 1 wherein said monomer comprises triallyl cyanurate.

9. An article capable of recovering an original shape upon the application of heat, said article having been formed by the steps comprising heating a shaped article comprising a high energy irradiation cross-linked mixture of a vinyl chloride polymer with an essentially nonvolatile volatile polymerizable polyunsaturated monomer to its softening range; deforming said heated article and cooling said deformed article whereby said article is caused to retain its deformed shape until heated to cause it to recover substantially its original shape.

10. The article of claim 9 wherein said monomer is triallyl cyanurate and said monomer is polyvinyl chloride.

11. The article of claim 9 wherein said polymer is polyvinyl chloride.

12. The article of claim 9 wherein said mixture is irradiated to a dose of between about 0.1 and about 100 megarads.

13. The article of claim 9 wherein said monomer is present in an amount of from about 10 to about 200 parts by weight and said vinyl chloride polymer is present in an amount of about 100 parts by weight.

14. The article of claim 9 wherein said monomer is selected from the group consisting of allyl esters of polycarboxylic acids, polyallyl esters of cyanuric acid, polyvinyl aromatic hydrocarbons, polymethacrylamides, and polyacrylates and polymethacrylates of saturated polyalcohols.

15. The article of claim 9 wherein said monomer comprises triallyl cyanurate.

References Cited

UNITED STATES PATENTS

| 2,027,962 | 1/1963 | Currie | 264—230 |
| 2,689,242 | 9/1954 | Lucht | 260—87.1 |
| 2,876,895 | 3/1959 | Port et al. | 260—87.1 |
| 2,945,795 | 6/1960 | Cummin | 264—159.12 |
| 2,981,668 | 4/1961 | Brasch | 204—159.13 |
| 3,012,001 | 12/1961 | Smith | 204—159.15 |
| 2,155,590 | 4/1939 | Garvey | 260—876 |
| 2,670,483 | 3/1954 | Brophy | 204—159.17 |
| 2,945,795 | 6/1960 | Cummin | 204—159.17 |
| 3,012,001 | 12/1957 | Smith | 204—159.17 |

OTHER REFERENCES

A. Charlesby: Nucleonics, vol. 12, June 1954, pages 15–25.

MURRAY TILLMAN, *Primary Examiner.*

R. TURER, W. L. BASCOMB, *Assistant Examiners.*